United States Patent
Demas

(10) Patent No.: US 10,718,685 B2
(45) Date of Patent: Jul. 21, 2020

(54) LIQUID LEAK DETECTOR WITH PLURALITY OF DETECTION POSITIONS

(71) Applicant: Nickolas Peter Demas, Cambridge, MA (US)

(72) Inventor: Nickolas Peter Demas, Cambridge, MA (US)

(*) Notice: Subject to any disclaimer, the term of this patent is extended or adjusted under 35 U.S.C. 154(b) by 15 days.

(21) Appl. No.: 16/142,385

(22) Filed: Sep. 26, 2018

(65) Prior Publication Data

US 2019/0094098 A1    Mar. 28, 2019

Related U.S. Application Data

(60) Provisional application No. 62/563,899, filed on Sep. 27, 2017.

(51) Int. Cl.
   *G01M 3/18* (2006.01)
   *G08B 21/20* (2006.01)
   *G01N 27/02* (2006.01)

(52) U.S. Cl.
   CPC ............. *G01M 3/18* (2013.01); *G01N 27/02* (2013.01); *G08B 21/20* (2013.01)

(58) Field of Classification Search
   CPC ......... G01M 3/18; G01N 27/07; G08B 21/20; G08B 21/08; G01F 23/241
   USPC ....................................................... 324/693
   See application file for complete search history.

(56) References Cited

U.S. PATENT DOCUMENTS

| | | | | |
|---|---|---|---|---|
| 4,227,190 A * | 10/1980 | Kelley | ............... | G01F 23/241 340/604 |
| 4,264,902 A * | 4/1981 | Miller | ............... | G08B 21/20 340/602 |
| 4,845,472 A * | 7/1989 | Gordon | ............... | D06F 39/081 340/605 |
| 5,272,467 A * | 12/1993 | Krauleidis | ............... | D06F 39/081 340/604 |
| 5,757,197 A * | 5/1998 | O'Neill | ............... | G01F 23/24 324/446 |
| 6,690,281 B2 * | 2/2004 | Palmer | ............... | G08B 21/08 340/604 |
| 8,091,715 B2 * | 1/2012 | Roth | ............... | A47B 43/02 211/187 |
| 8,790,385 B2 * | 7/2014 | Dorn | ............... | A61F 2/95 623/1.11 |
| 8,970,386 B2 * | 3/2015 | Scharf | ............... | G01M 3/16 340/604 |
| 10,393,687 B1 * | 8/2019 | Ostashev | ............... | G01N 27/07 |
| 2013/0069675 A1 * | 3/2013 | Woloszyk | ............... | G01R 27/22 324/693 |

* cited by examiner

*Primary Examiner* — Albert K Wong

(57) ABSTRACT

A device for the measurement of electrical properties on a surface. Sensor consists of several conductive elements arranged at vertices of a three-dimensional geometry. As such, the device achieves a favorable sensing configuration regardless of initial orientation. The device includes circuitry for interfacing with the conductive elements. This circuitry determines the electrical properties of the surface. The measurement has many uses, one of which is to discriminate between dry and wet surfaces. This patent presents various analysis methods to determine the electrical property.

10 Claims, 4 Drawing Sheets

LIQUID LEAK DETECTOR WITH PLURALITY OF DETECTION POSITIONS

SUMMARY

This invention allows for detecting changes in electrical properties of a surface. This change commonly occurs when conductive liquid pools on said surface. This invention could be used for both commercial and residential water leak/flooding sensors and chemical leak detection. The main benefit over the prior art is that this invention is inexpensive and simple to manufacture, can be deployed quickly and easily in difficult to reach or hazardous locations, and is resistant to failure modes associated with jarring/jostling other sensor designs. The inclusion of electrical impedance measurement allows for liquid to be identified, which could be useful in a manufacturing environment where multiple chemicals are handled.

DETAILED DESCRIPTION

Detecting liquid leaks is of great interest and has been the topic of a number of prior art disclosures in the literature (U.S. Pat. Nos. 5,790,036, 7,948,388, US20080053197, US20110214490, U.S. Pat. Nos. 6,175,310, 6,873,263, GB2369912, US20140104065, US20140260554, Honeywell RWD11 Water Alarm, Glentronics, Inc. BWD-HWA Basement Watchdog Water Sensor and Alarm). Some have been developed to detect liquid emissions from animals (U.S. Pat. No. 5,790,036). For the protection of property, some have been developed for detecting water leaks in ceilings (U.S. Pat. No. 7,948,388) while others have been developed for detecting leaks when they pool on planar floors (US20080053197, US20110214490, U.S. Pat. Nos. 6,175,310, 6,873,263, GB2369912, US20140104065, US20140260554, Honeywell RWD11 Water Alarm, Glentronics, Inc. BWD-HWA Basement Watchdog Water Sensor and Alarm).

Liquid leak detectors typically employ 2 conductive terminals to detect a leak, between which electrical properties of the gap can be determined. Many liquids, such as tap water, have much higher conductivity than air or concrete, wood, or polymer flooring on which the electrodes sit. As such, when a conductive liquid path presents between the terminals, the DC resistance changes dramatically and this can be detected by circuitry within the leak detector.

Two types of conductive terminal configurations are common. One configuration (referred to hereinafter as the "Bottom Terminal Configuration") has flat conductive terminals rigidly fixed that rest on the floor (US20080053197, U.S. Pat. No. 6,873,263, GB2369912, US20140104065, US20140260554, Honeywell RWD11 Water Alarm, Glentronics, Inc. BWD-HWA Basement Watchdog Water Sensor and Alarm). This configuration is extremely simple to manufacture and therefore inexpensive, does not suffer from water retention (which could cause mold or mildew), and offers point detection capability but can be undermined if the device is jarred or jostled and one or both terminals lift off the floor because it is rigid. If one or both terminals lift off the floor, the conductive liquid pool must accumulate to whatever height the highest terminal rests (with respect to the floor) increasing leak volume and related damage. It is quite easy for the terminals in these devices to lift off the planar floor given there is only one position in which the device can sense electrical properties.

Another terminal configuration has two parallel conductors that run along a rope assembly and are separated by a permeable material (referred to hereinafter as the "Rope Configuration") (US20110214490, U.S. Pat. No. 6,175,310). This configuration is more complicated to manufacture and therefore expensive compared to the Bottom Terminal Configuration, could suffer from water retention in the permeable material leading to mold or mildew proliferation, and is a line detector which could make it difficult to pinpoint the location of a leak. However, its benefit is that it does not have a preferred deployment orientation meaning that if it is jarred or jostled the sensor will provide the same leak detection capability.

The invention presented in this application improves upon the Bottom Terminal Configuration, teaching away from a preferred detection orientation indicated in the prior art. However, The invention presented in this application also benefits from the simplicity to manufacture and install, lack of permeable material, and point detection capability of the Bottom Terminal Configuration, teaching away from the shortcomings of the Rope Configuration.

Bottom Terminal Configuration leak detectors also must be carefully installed upright to satisfy the requirement that both terminals must be very near the floor on which the leak will be detected. This precludes the installation of leak detectors in difficult-to-reach or hazardous locations without substantial planning and effort.

Users are often interested in an inconspicuous installation for aesthetics. Additionally, installation behind a piece of equipment reduces the likelihood of the sensor being moved or damaged by local activities. However, leak detectors are often installed as a reactive measure after a piece of equipment has leaked, meaning the large piece of equipment that leaked has already been installed and can't easily be moved. This makes installation in an inconspicuous spot behind the equipment impossible.

The invention presented in this application allows for easy installation behind a piece of installed equipment given it is agnostic to the deployment orientation and will sit flat against any horizontal or gently inclined surface. This allows for installation locations that are both invisible and well protected from movement and damage.

The three-dimensional geometric shape of the probe could be any one of a multitude of polyhedrons (see examples in Appendix A). Some examples include platonic solids, archimedean solids, catalan solids, prisms, bipyramids, antiprisms, and trapezohedra. The solids also need not be convex polyhedrons. However, convex polyhedrons with only triangular faces are particularly well suited for use in the probe as the three vertices on each face exactly constrain the sensor against a planar floor. However, given the small size to which the probe could be fabricated and the relatively good flatness with most floors, polyhedrons with faces with more than 3 edges could be used even though it is over constrained.

Many different configurations of electrically conductive feet could be used. At the bare minimum, two electrically conductive feet must be in contact with the floor at all times. Different configurations could allow for parallel sensing between multiple electrically conductive feet in contact with the floor to refine measurements.

Elementary implementations would measure the DC resistance between two electrically conductive feet. These methods are well documented in the literature.

More advanced implementations would measure electrical impedance between the terminals. Various approaches are available for this measurement. Swept sine analysis allows for linear, time invariant impedance transfer functions to be characterized. Stochastic system identification offers good resistance to electrical and mechanical interference, with both linear and nonlinear modeling approaches available.

The probe electronics could be sealed against liquid penetration if there exist electronics in the probe in addition to the electrically conductive terminals.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

Figure 1:
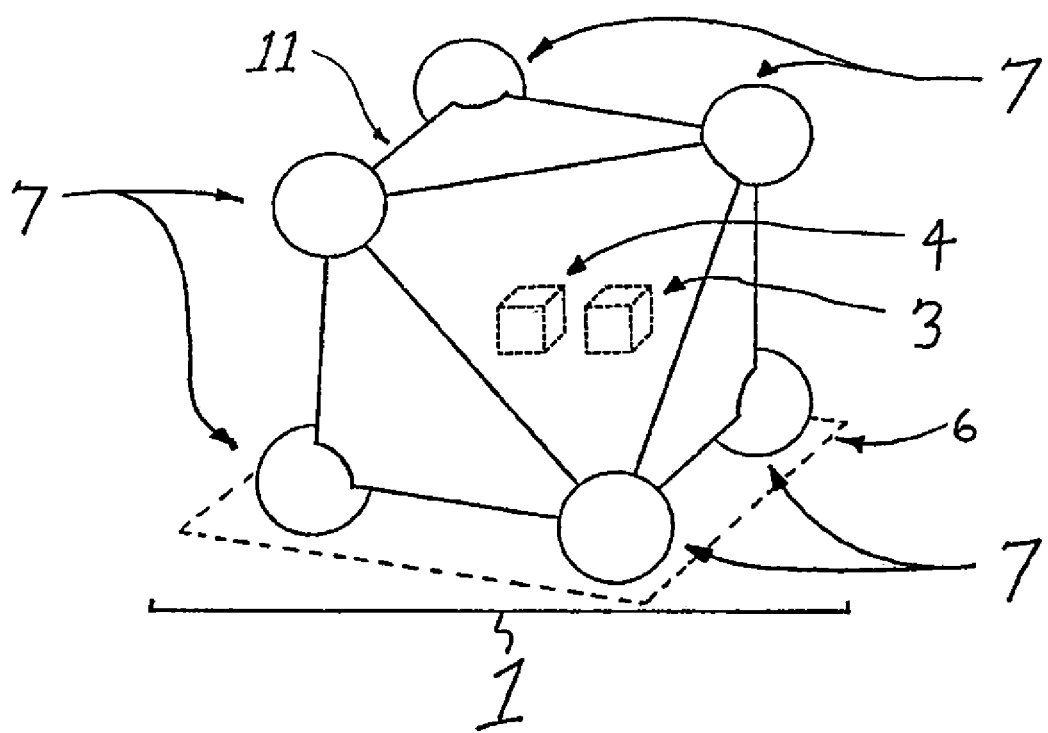
FIG. 1: Self-contained Sensing Configuration.
1 is the probe.
3 is the sensing circuitry.
4 is the power source, communications system, alarm system, and/or display interface
6 is the planar surface
7 is the electrically conductive terminals at the vertices of the probe.
Figure 2:
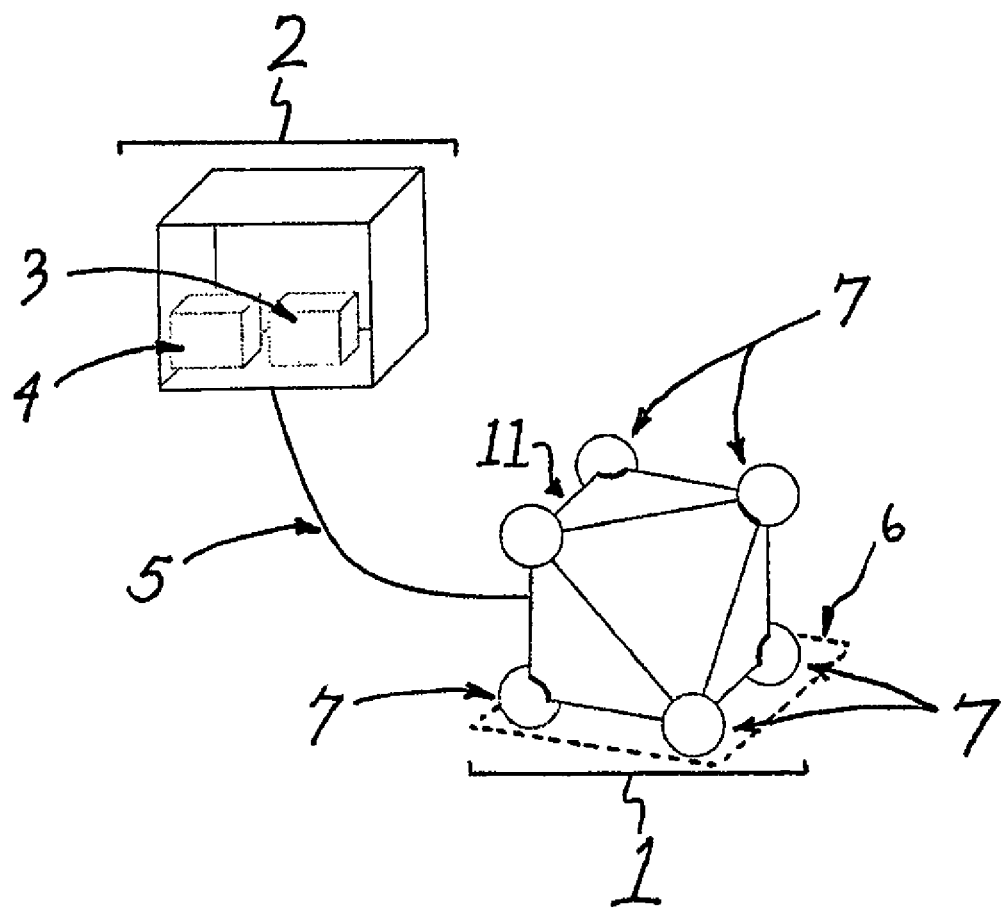
FIG. 2: Tethered Sensing Configuration.
1 is the probe.
2 is the remote power and circuitry enclosure.
3 is the sensing circuitry.
4 is the power source, communications system, alarm system, and/or display interface
5 is the power and signal tether
6 is the sensor enclosure
7 is the electrically conductive terminals at the vertices of the probe.
Figure 3:
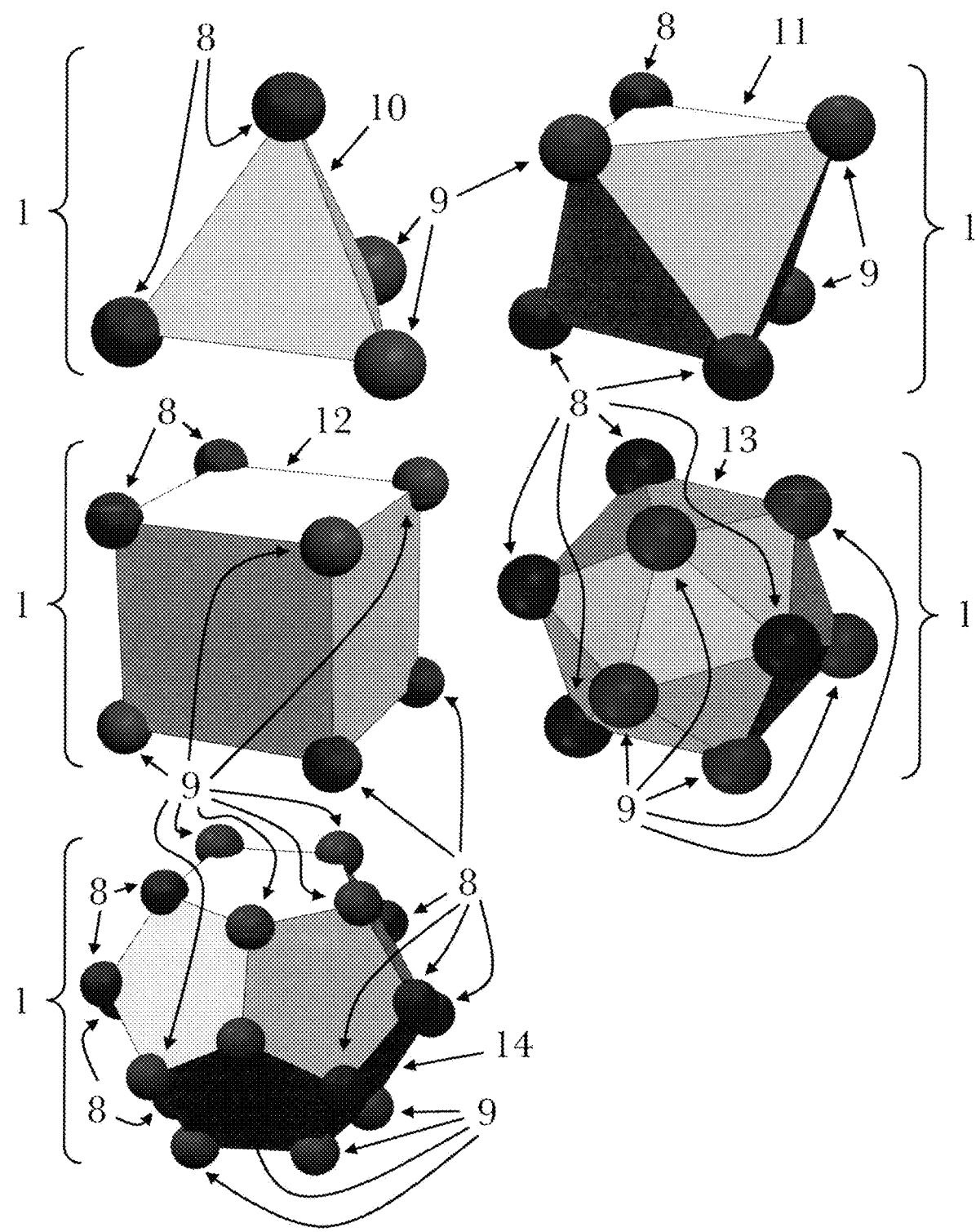
FIG. 3: Examples of possible 2 polarity configurations for platonic solids as the three-dimensional geometry formed by the vertices.
1 is the probe.
8 is the negative electrically conductive terminal.
9 is the positive electrically conductive terminal.
10 is a tetrahedron three-dimensional geometry.
11 is an octahedron three-dimensional geometry.
12 is a cube three-dimensional geometry.
13 is an icosahedron three-dimensional geometry.
14 is a dodecahedron three-dimensional geometry.
Figure 4:
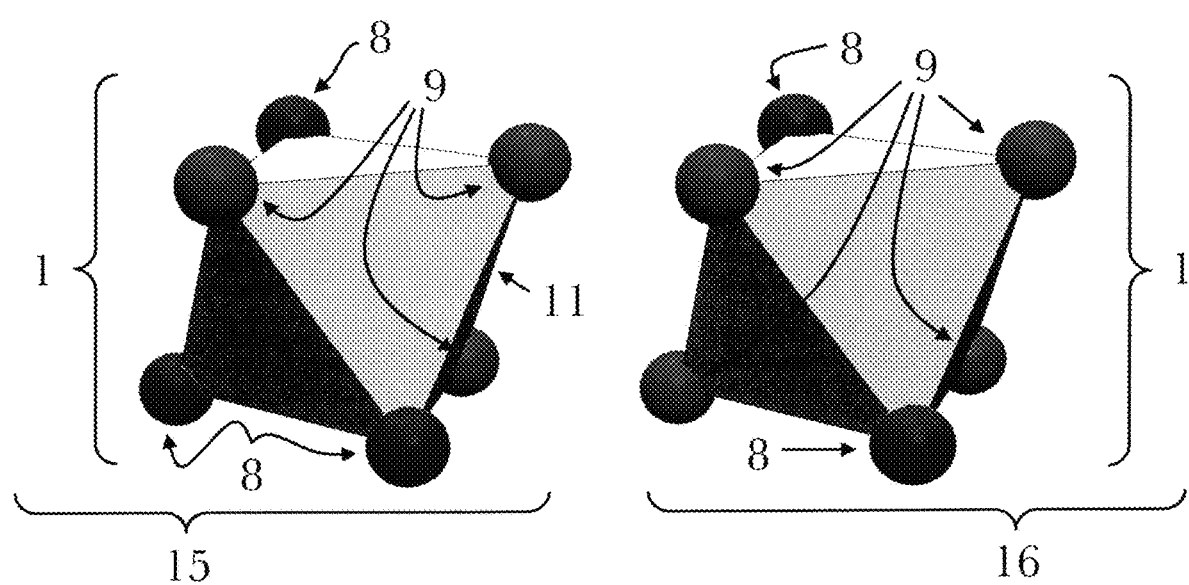
FIG. 4: Examples of different 2 polarity configurations for one three-dimensional geometry (the octahedron) formed by the vertices.
1 is the probe.
8 is the negative electrically conductive terminal.
9 is the positive electrically conductive terminal.
11 is an octahedron three-dimensional geometry.
15 is a first electrode layout example.
16 is a second electrode layout example.

The invention claimed is:

1. A device for sensing a presence of a conductive fluid, comprising:
 a probe having four or more vertices which define a three-dimensional geometric shape having sides wherein at least a pair of conductive terminals are formed on different vertices on a plurality of different sides on the three-dimensional geometric shape; and
 circuitry electrically coupled to the conductive terminals to measure the conductance of a substance between the pairs of conductive terminals.

2. The device in claim 1, wherein the circuitry is integrated within the probe to form a self-contained sensor.

3. The device in claim 1, wherein the circuitry and the probe are connected by a tether which carries power and signals.

4. The device in claim 1, wherein the three-dimensional geometric shape of the probe is formed by folding a planar sheet.

5. The device of claim 1, wherein conductive terminals are located on every vertice of the three-dimensional geometric shape.

6. The device of claim 1, wherein the circuitry is configured to sequentially measure the conductivity between each of the pairs of electrodes.

7. The device of claim 1, wherein the conductivity is determined by measuring DC resistance between each pair of terminals.

8. The device of claim 1, wherein the conductivity is determined by measuring the impedance between each pair of terminals.

9. The device of claim 1, wherein the conductive fluid is water.

10. A method for sensing the presence of a conductive fluid, comprising:
 placing the device for sensing in claim 1 on a planar surface wherein at least one pair of electrodes is in contact with the planar surface;
 electrically stimulating the at least one pair of electrodes;
 measuring an electrical response at at least one pair of electrodes; and
 determining the conductivity between the at least one pair of electrodes.

* * * * *